(12) United States Patent
Nishikawa et al.

(10) Patent No.: US 9,671,055 B2
(45) Date of Patent: Jun. 6, 2017

(54) VACUUM HEAT INSULATING MATERIAL

(71) Applicant: Panasonic Intellectual Property Management Co., Ltd., Osaka (JP)

(72) Inventors: Yukio Nishikawa, Osaka (JP); Akira Takara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 28 days.

(21) Appl. No.: 14/932,890

(22) Filed: Nov. 4, 2015

(65) Prior Publication Data

US 2016/0138750 A1     May 19, 2016

(30) Foreign Application Priority Data

Nov. 13, 2014   (JP) ................................. 2014-230597
Aug. 20, 2015   (JP) ................................. 2015-163048

(51) Int. Cl.
*F16L 59/065*     (2006.01)
*B32B 15/08*      (2006.01)
(Continued)

(52) U.S. Cl.
CPC .............. *F16L 59/065* (2013.01); *B32B 1/00* (2013.01); *B32B 3/04* (2013.01); *B32B 3/08* (2013.01); *B32B 3/266* (2013.01); *B32B 3/28* (2013.01); *B32B 7/12* (2013.01); *B32B 15/08* (2013.01); *B32B 15/20* (2013.01); *B32B 27/08* (2013.01); *B32B 27/12* (2013.01); *B32B 27/304* (2013.01); *B32B 27/32* (2013.01); *B32B 27/322* (2013.01); *B32B 27/34* (2013.01); *B32B 2250/44* (2013.01); *B32B 2255/10* (2013.01); *B32B 2255/205* (2013.01); *B32B 2262/10* (2013.01); *B32B 2307/20* (2013.01); *B32B 2307/304* (2013.01); *B32B 2307/51* (2013.01); *B32B 2509/10* (2013.01); *B32B 2607/00* (2013.01)

(58) Field of Classification Search
CPC ..... Y10T 428/231; F16L 59/065; E04B 1/803
USPC ......................................................... 428/69
See application file for complete search history.

(56) References Cited

U.S. PATENT DOCUMENTS 4,669,632 A    6/1987   Kawasaki et al.
5,376,424 A   12/1994   Watanabe
(Continued)

FOREIGN PATENT DOCUMENTS

JP    60-208696    10/1985
JP    61-168772     7/1986
(Continued)

*Primary Examiner* — Alexander Thomas
(74) *Attorney, Agent, or Firm* — Panasonic IP Management

(57) ABSTRACT

To provide a vacuum heat insulating material having good heat insulating characteristics and capable of forming a corner part with high reliability. The vacuum heat insulating material includes a core material including an inorganic fiber assembly, and an outer covering member covering at least one surface of the core material, the inside of which is decompressed and sealed, in which the outer covering member includes an outermost resin layer and radiation prevention layers positioned inside the resin layer, in which the radiation prevention layers have an overlapping part where at least two or more radiation prevention layers are stacked at apart thereof.

6 Claims, 7 Drawing Sheets

(51) Int. Cl.

| | | |
|---|---|---|
| B32B 3/26 | (2006.01) | |
| B32B 15/20 | (2006.01) | |
| B32B 7/12 | (2006.01) | |
| B32B 27/08 | (2006.01) | |
| B32B 27/12 | (2006.01) | |
| B32B 27/30 | (2006.01) | |
| B32B 27/32 | (2006.01) | |
| B32B 27/34 | (2006.01) | |
| B32B 1/00 | (2006.01) | |
| B32B 3/04 | (2006.01) | |
| B32B 3/08 | (2006.01) | |
| B32B 3/28 | (2006.01) | |

(56) References Cited

U.S. PATENT DOCUMENTS 5,660,924 A   8/1997   Yamaji et al.
2003/0134078 A1   7/2003   Urata et al.
2007/0059499 A1   3/2007   Yuasa et al.
2014/0216100 A1*  8/2014   Toshimitsu ........... F16L 59/065
                                                          62/440

FOREIGN PATENT DOCUMENTS

| JP | 62-013979 | 1/1987 |
| JP | 62-087294 U | 6/1987 |
| JP | 63-163764 | 7/1988 |
| JP | 5-215291 | 8/1993 |
| JP | 7-280170 | 10/1995 |
| JP | 10-238938 | 9/1998 |
| JP | 2001-032992 | 2/2001 |
| JP | 2005-163989 | 6/2005 |
| JP | 2007-056973 | 3/2007 |
| JP | 2008-256038 | 10/2008 |
| JP | 2010-284855 | 12/2010 |
| JP | 2011-058537 | 3/2011 |
| JP | 2014-005872 | 1/2014 |
| WO | 2005/068180 | 7/2005 |

\* cited by examiner

VACUUM HEAT INSULATING MATERIAL

BACKGROUND OF THE INVENTION

1. Field of the Invention

The present invention relates to a vacuum heat insulating material used for a refrigerator, a refrigerator truck and so on.

2. Description of Related Art

A related-art vacuum heat insulating material is fabricated by covering a core material formed of glass wool and the like with an outer covering material formed of a gas barrier film to thereby decompress and seal the inside. Most of the vacuum insulating materials have a flat plate shape with a thickness of 3 mm to 20 mm and are applied to products such as the refrigerator in the original shape mainly under the circumstances of the fabricating method and the reliability. In order to improve heat insulating characteristics of the heat insulating material, it is important to use a substance to which heat is hardly transferred as a constituent material, to reduce the contact area between materials and to control the heat transfer to a direction of a surface perpendicular to the heat insulating direction for suppressing conduction and radiation of heat.

As application examples of the vacuum heat insulating material, an example in which fibers are arranged perpendicular to the heat insulating direction to suppress the heat conduction amount (for example, refer to JP-A-60-208696 (Patent Document 1)), an example in which a metal foil or a metal deposition film having an excellent effect of blocking the radiation heat is buried (for example, refer to JP-A-62-13979 (Patent Document 2)), an example in which a plate-like substance such as mica having an excellent effect of blocking the radiation heat is integrated with a core material such as a glass mat by a resin and stacked in a plane (for example, refer to JP-A-10-238938 (Patent Document 3)) can be cited. In Patent Document 3, a composite material in which the plate-like substance is laminated in the surface direction is formed by uniformly dispersing a slurry liquid on the glass mat, in which the plate-like substance such as mica having the excellent effect of blocking the radiation heat is dispersed.

Apart to be insulated is not always a flat surface shape. When there is a corner part, a protrusion or a step in the part to be insulated, there is known a method in which processing such as bending, drilling and so on is performed in the vacuum heat insulating material, and the shape of the outer covering material is previously formed to allow the shape of the vacuum heat insulating material to correspond to the shape of the part to be insulated. As forming methods, there are a method in which a bag-shaped outer shell material houses a powdered or granular filler, the top and bottom of the outer shell material are compressed by using a die having a convex portion, and the inside of the outer shell material is evacuated to thereby form a concave portion in the surface (for example, refer to JP-A-61-168772 (Patent Document 4), and a method in which the inside of a film container filled with a heat insulating material is decompressed, a plate-shaped vacuum heat insulating material fabricated in a sealed state by heat sealing is molded in a decompressed state in a vacuum container, and the pressure is returned to a normal pressure while holding the material (for example, refer to JP-A-63-163764 (Patent Document 5).

SUMMARY OF THE INVENTION

However, in the methods in which the metal foil or the metal deposition film is merely buried, electromagnetic waves leak and radiation is increased at a discontinuous part derived from the limited length of the foil or the film. When the resin in which the plate-like substance is laminated is integrated with the core material, the conductive heat transfer is increased and the heat insulating characteristics are reduced. The part to be insulated may have a corner part. When the vacuum heat insulating material is applied to a product having the corner part, there is a problem in the related-art forming methods that an apparatus have to be large in scale as it is necessary to install a forming die in a vacuum chamber or the forming die itself is used as an evacuation device. There is another problem that the film of the outer shell material or the plate-like substance having the effect of blocking radiation is extended at the molding and the reliability of the vacuum heat insulating material is reduced.

An object of the present disclosure is to provide a vacuum heat insulating material having good heat insulating characteristics and capable of forming a corner part with high reliability.

According to an embodiment of the present invention, there is provided a vacuum heat insulating material including a core material including an inorganic fiber assembly and an outer covering member covering at least one surface of the core material, the inside of which is decompressed and sealed, in which the outer covering member includes an outermost resin layer and radiation prevention layers positioned inside the resin layer, in which the radiation prevention layers have an overlapping part where at least two or more radiation prevention layers are stacked at a part thereof.

According to the above structure, even when the vacuum heat insulating material is bent for providing a corner part, the film of the outer covering material is extended, sliding occurs in stacked two-layer plate shaped substances with small ductility and radiation effect, and two layers surely overlap each other, therefore, the radiation prevention effect can be secured. It is also possible to form the corner part without reducing the reliability.

When the vacuum heat insulating material of the disclosure as described above is used, the vacuum heat insulating material which has good heat insulating characteristics as the radiation prevention effect is not reduced as well as capable of forming a corner part with high reliability can be provided.

DESCRIPTION OF EMBODIMENTS

Figure 1:
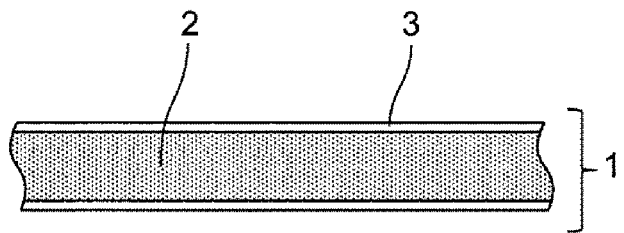
FIG. 1 is a cross-sectional view of a vacuum heat insulating material according to Embodiment 1.

A vacuum heat insulating material according to an embodiment includes a core material including an inorganic fiber assembly and an outer covering member covering at least one surface of the core material, the inside of which is decompressed and sealed, in which the outer covering member includes an outermost resin layer and radiation prevention layers positioned inside the resin layer, in which the radiation prevention layers have an overlapping part where at least two or more radiation prevention layers are stacked at a part thereof.

In the vacuum heat insulating material according to the embodiment, the overlapping part may have a space between the overlapping radiation prevention layers.

In the vacuum heat insulating material according to the embodiment, the radiation prevention layers may have a thin-plate shape, and a length of the overlapping part may be a length larger than a length calculated by tan 15°×(a thickness of a resin layer)×(20−(the number of stacked resin layers+1)) with respect to the thickness of the resin layer provided between the stacked radiation prevention layers.

In the vacuum heat insulating material according to the embodiment, the vacuum heat insulating material may have a corner part, and a plate thickness of the vacuum heat insulating material may be 4 times or less of a bending radius of the corner part.

In the vacuum heat insulating material according to the embodiment, the outermost resin layer of the outer covering material may be formed of a material which can be extended 200% or more.

In the vacuum heat insulating material according to the embodiment, the radiation prevention layer may include a metal layer and a thickness of the metal layer may be 40 nm or more.

In the vacuum heat insulating material according to the embodiment, the metal layer of the radiation prevention layer may be made of aluminum.

In the vacuum heat insulating material according to the embodiment, the radiation prevention layer may include a first radiation prevention layer having a through hole, and a second radiation prevention layer covering the through hole and forms an annular overlapping part stacked on the first radiation prevention layer around the through hole.

Hereinafter, a vacuum heat insulating material according to an embodiment will be explained with reference to attached drawings. In the drawings, the same symbols are given to substantially the same members.

Embodiment 1

FIG. 1 is a cross-sectional view of a vacuum heat insulating material according to Embodiment 1. As shown in FIG. 1, a vacuum heat insulating material 1 includes a core material 2, an outer covering material 3 covering the core material 2. The inside of the vacuum heat insulating material 1 is decompressed and sealed. The outer covering material 3 is provided so as to cover both surfaces of the core material 2.

The decompression and sealing of the vacuum heat insulating material 1 are performed to be lower than an atmospheric pressure. The sealing does not require strict airtightness.

Components included in the vacuum heat insulating material 1 will be explained below.

Core Material

The core material 2 may be an inorganic fiber assembly. As the core material, for example, glass wool, rock wool, carbon fibers, ceramic fibers and so on may be used. The above materials are cited as examples, and the present invention is not limited to them. The core material is preferably made of a material which can be bent at the time of forming a corner part when used for the corner part.

Outer Covering Material

Figure 2:
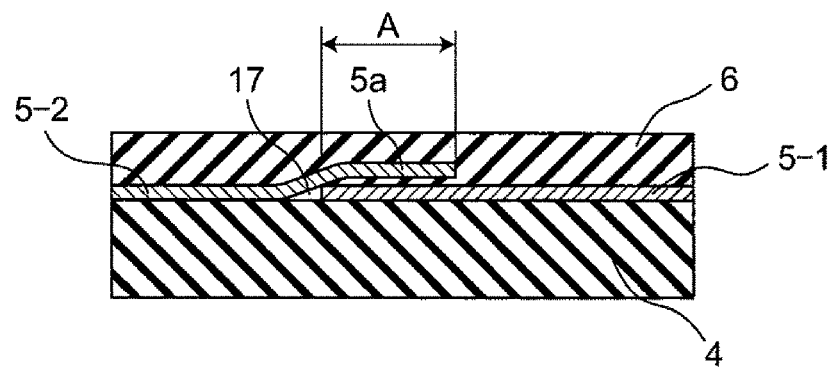
FIG. 2 is a cross-sectional enlarged view of an outer covering material of the vacuum heat insulating material according to Embodiment 1.
Figure 3:
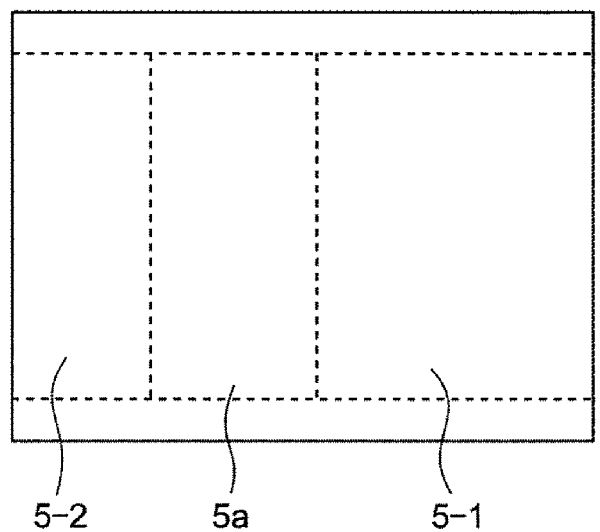
FIG. 3 is a plan view of FIG. 2.

FIG. 2 is a cross-sectional enlarged view of the outer covering material 3. FIG. 3 is a plan view of FIG. 2. The outer covering material 3 has a stacked structure including an inside resin layer 4, radiation prevention layers 5-1, 5-2 and an outermost resin layer 6. The radiation prevention layers 5-1 and 5-2 partially overlap each other at end portions to form an overlapping part A.

Figure 4:
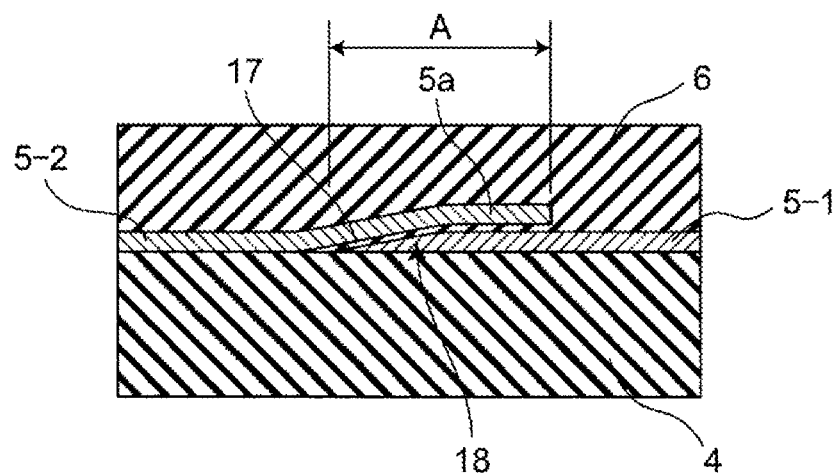
FIG. 4 is a cross-sectional enlarged view of an outer covering material of a vacuum heat insulating material according to modification example.

FIG. 4 is a cross-sectional enlarged view of an outer covering material 3 of a vacuum heat insulating material according to modification example. In the modification example, an end portion 18 of the radiation prevention layer 5-1 is formed in a tapered end portion tapering at a tip side, however, the present invention is not limited to this. For example, the end portion 18 may be formed in a triangular shape, a wedge shape and so on. Accordingly, it is possible to allow the layers to slide smoothly when an overlapping part A1 in which the radiation prevention layer 5-1 and the radiation prevention layer 5-2 overlap each other is deformed.

Radiation Prevention Material

As the radiation prevention layers 5-1 and 5-2, layers not transmit electromagnetic waves and blocks the electromagnetic waves. For example, the layers may be formed of an aluminum foil (plate thickness of 0.1 mm). The radiation prevention layers 5-1 and 5-2 are not limited to the aluminum foil and may be an aluminum deposition film and so on. Metals other than aluminum or materials having the same radiation prevention function may be adopted. The radiation prevention layers 5-1 and 5-2 have the overlapping part A in which two layers of the radiation prevention layers 5-1 and 5-2 (for example, the aluminum foil) overlap each other over a range of a length A. In the overlapping part A, there is little gap between the radiation prevention layers 5-1 and 5-2, therefore, the transmission of electromagnetic waves which generates radiation in the plate thickness direction does not occur as long as there is a little overlapping part. When roughly classifying heat transfer mechanisms in a substance, there are conductive heat transfer, gaseous heat transfer, convective heat transfer, radiation heat transfer and combinations of the above. As the degree of vacuum inside the vacuum heat transfer material 1 is sufficiently high, effects of convection and gaseous heat transfers can be almost ignored, and only the conductive heat transfer and the radiation heat transfer matter. Concerning the conductive heat transfer, effects of the conductive heat transfer can be ignored by reducing the contact area between the core material 2 and the outer covering material 3 or by arranging a resin material and so on with a lower heat conductivity in a contact surface with respect to the core material 2. Concerning the radiation heat transfer, heat transfer from the high-temperature side can be prevented by providing a matter which blocks electromagnetic waves in the middle. Accordingly, the aluminum foil is arranged outside the resin layer 4 positioned in the inside as the radiation prevention layers 5-1 and 5-2. The radiation prevention layer 5-1 and the radiation prevention layer 5-1 are arranged so that respective end portions overlap each other. Aluminum is a metal having excellent ductility and workability. Generally, there is a thickness called an absorption length, which is the maximum length of the substance which transmits electromagnetic waves. The absorption length may be a length in which the intensity of electromagnetic waves is attenuated to $1/e^2$ or less. In near infrared rays having a wavelength of 1 μm and far infrared rays having a wavelength of 10 μm, electromagnetic waves are not transmitted when aluminum has a thickness of 15 nm or more, and nickel which has the longest absorption length in other practical metal materials has a thickness of 40 nm or more. Accordingly, the overlapping part A is formed by allowing the two layers of radiation prevention layers 5-1 and 5-2 to overlap each other to prevent electromagnetic waves from being transmitted at a discontinuous part in the end portion of the radiation prevention layer 5-1 and or the radiation prevention layer 5-2. As shown in the plan view of FIG. 3, the overlapping part A has a shape surrounded by straight lines of respective end portions of the radiation prevention layers 5-1 and 5-2, however, the present invention is not limited to this. For example, when the end portions of the radiation prevention layers 5-1 and 5-2 have curved lines, the overlapping part A can be a shape surrounded by curved lines.

As shown in FIG. 2, there exists a space 17 in the overlapping part A. When there exists the space 17, the heat transfer property is deteriorated in this part and the effect of heat insulating characteristics is increased. On the other hand, in the modification example of FIG. 4, the space 17 in the overlapping part A1 is reduced, however, the sliding becomes easy at the time of deformation as described above. The material for the radiation prevention layers 5-1 and 5-2 is not limited to aluminum, and metals other than aluminum or materials having the radiation prevention function can be used. The inside resin layer 4 may have a function of fixing the radiation prevention layer 5-1. The inside resin layer 4 does not have to fix the radiation prevention layer 5-2. On the other hand, the outermost resin layer 6 may have functions of preventing heat transfer from the outer air and fixing the radiation prevention layer 5-2. The outermost resin layer 6 does not have to fix the radiation prevention layer 5-1. Any one of or both of the radiation prevention layers 5-1 and 5-2 does not have to be fixed to both of the resin layers 4 and 6. When at least one of the radiation prevention layers 5-1 and 5-2 is not fixed to at least one of the resin layers 4 and 6, the sliding is easily performed at the time of deformation while maintaining the overlapping part A. The fixing between the radiation prevention layers 5-1, 5-2 and the resin layers 4, 6 may be performed by using an adhesive or by thermoplastic bonding.

Resin Layer

The outer covering member 3 includes the inside resin layer 4 and the outermost resin layer 6. The resin layers 4 and 6 are preferably formed of materials which can be extended at the time of forming a corner part as described later. As materials for the resin layers 4 and 6, for example, polyamide, fluororesin and vinyl chloride resin can be used. Polyamide, fluororesin and vinyl chloride resin can be used for applications in which the resin layers are extended to about three times. Also as materials for the resin layers 4 and 6, polypropylene and polyethylene can be used. Polypropylene and polyethylene can be used for applications in which the resin layers are extended to about eight times. The inside resin layer 4 and the outermost resin layer 6 may be made of different materials.

Figure 5:
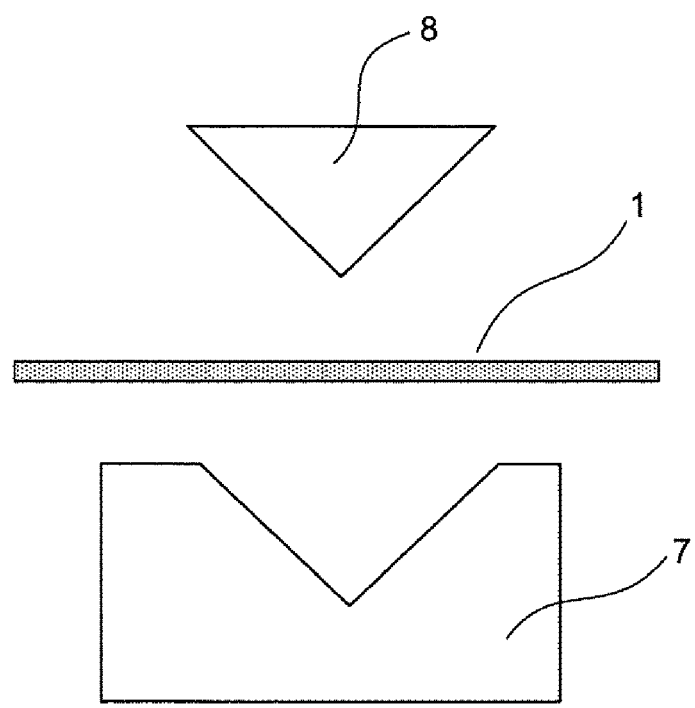
FIG. 5 is a conceptual diagram of a process of bending the vacuum heat insulating material according to Embodiment 1 by a metal mold.

FIG. 5 is a conceptual diagram of a process of bending the vacuum heat insulating material 1 by a metal mold for applying the vacuum heat insulating material 1 to a corner part of a product. For example, it is preferable that the vacuum heat insulating material 1 is installed over a female die 7 and the vacuum heat insulating material 1 is folded by pressing down a male die 8 to thereby form a corner part along a concave portion of the female die 7. The method of forming the corner part in the vacuum heat insulating material 1 is not limited to the above method of using the metal mold.

Figure 6:
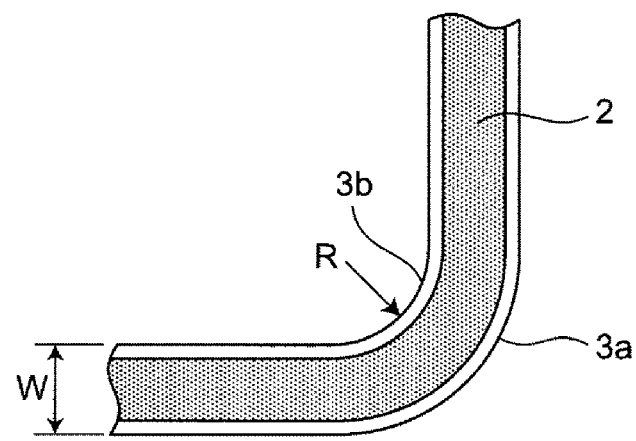
FIG. 6 is a cross-sectional conceptual diagram of the vacuum heat insulating material according to Embodiment 1 which is bent at right angles.

FIG. 6 is a cross-sectional conceptual diagram of the vacuum heat insulating material 1 which is bent at right angles, in which R denotes a bending radius and W denotes a thickness of the vacuum heat insulating material 1. Here, it is assumed a case in which the vacuum heat insulating material 1 having the plate thickness W of 20 mm which is practically closest to the maximum is bent at right angles with a bending radius R of 5 mm which is practically smallest. According to the processing, the extension of an outer peripheral side 3a of the outer covering material is five times as long as an inner side 3b of the outer covering material. When the plate thickness W is 5 mm, the extension of the outer peripheral side 3a of the outer covering material is twice as long as the inner side 3b of the outer covering material. As the extension of 200% is generated in the resin layers 4 and 6 in this case, materials which can be extended more have to be used. When the resin layers are extended to about three times, polyamide, fluororesin and vinyl chloride can be used, and when the resin layers are extended to eight times, polypropylene and polyethylene can be used. In the case where a corner part is the arc shape, the resin layers 4 and 6 are not broken until the length of extension generated from the difference between an inner diameter and an outer diameter reaches seven times as long as the plate thickness W. However, in the case where the extension exceeds the above, the resin layer 6 of the outer covering material 3 is broken even when the core material 2 can be bent, as a result, it is difficult to keep the degree of vacuum. Accordingly, it is preferable to apply the load corresponding to the material when the load is applied to the vacuum heat insulating material 1.

Figure 7:
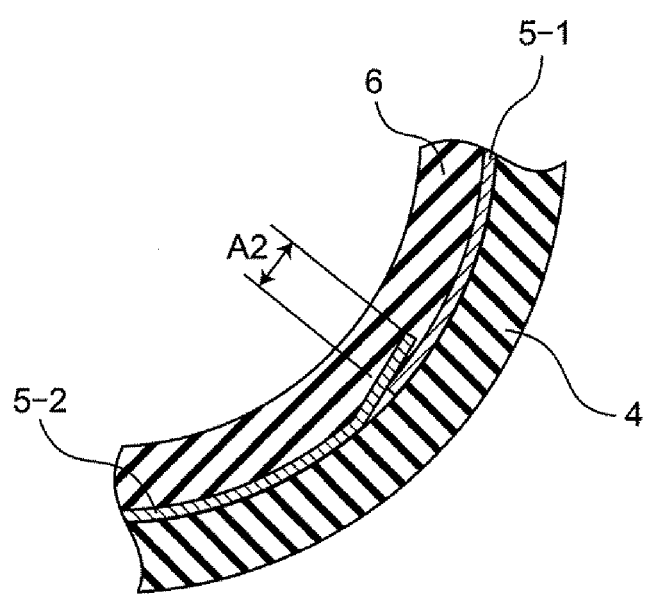
FIG. 7 is an enlarged view of the outer covering material of the vacuum heat insulating material according to Embodiment 1 obtained after the bending processing is performed.

FIG. 7 is an enlarged view of the outer covering material 3 obtained after the bending processing of FIG. 6 is performed. A2 denotes an overlapping length of the radiation prevention layers 5-1 and 5-2. The extension of the radiation prevention layers 5 is 50% or less at the maximum in the case of using aluminum having a good ductility as compared with the extension of the resin layers 4 and 6 which form the outer covering material 3. Accordingly, the extension is 39.25 mm which is a length of a ¼ circle with a radius equivalent to the sum of the bending radius R of 5 mm and the plate thickness W of 20 mm of the vacuum heat insulating material 1 (R+W) in FIG. 2 which is before the bending processing for absorbing the large extension of the resin layers 4 and 6. For example, when 50 mm is set as the overlapping length A which is larger than the calculated extension and the overlapping part is included in the bending processing part, an overlapping length A2 is secured after the bending processing as shown in FIG. 7, and the radiation prevention layers 5-1 and 5-2 are not discontinuous as the radiation surface. Accordingly, the heat insulating property is not reduced. It is preferable that lubricating processing is performed to the overlapping part by surface treatment and so on as the layers slide easily.

Embodiment 2

Figure 8:
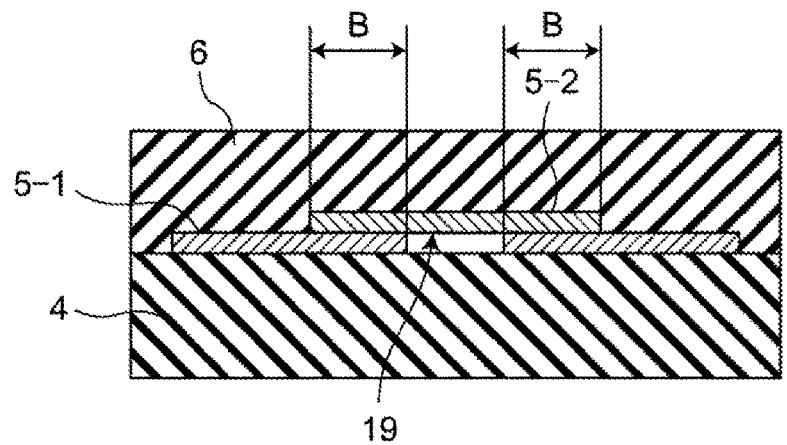
FIG. 8 is a cross-sectional enlarged view of an outer covering material of a vacuum heat insulating material according to Embodiment 2.
Figure 9:
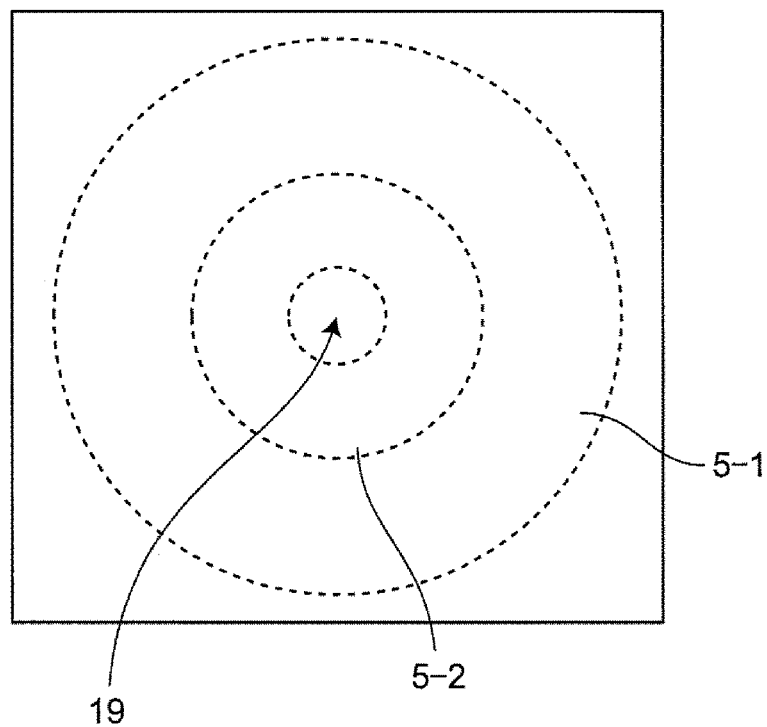
FIG. 9 is a plan view of FIG. 8.

FIG. 8 is a cross-sectional enlarged view of an outer covering material of a vacuum heat insulating material according to Embodiment 2 of the present invention. FIG. 9 is a plan view of FIG. 8. In FIG. 8, the same symbols are given to the same components as those of FIG. 2 and the explanation thereof is omitted. The outer covering material of the vacuum heat insulating material of FIG. 8 differs from the outer covering material of the vacuum heat insulating material of FIG. 2 in a point that a hole 19 penetrating the annular first radiation prevention layer 5-1 is a circular discontinuous part. The annular second radiation prevention layer 5-2 differs in a point that the layer covers the hole 19 of the first radiation prevention layer 5-1 and forms an annular overlapping part B in which the first radiation prevention layer 5-1 and the second radiation prevention layer 5-2 around the hole 19 are stacked.

When the corner part is three-dimensionally covered with the outer covering material, the circular hole 19 of the first radiation prevention layer 5-1 can be allocated to the corner part. As the annular overlapping part B is provided around the hole 19, the radiation prevention layers 5-1 and 5-2 are not discontinuous even when a slight misalignment occurs around the corner part, as a result, the heat insulating property is not reduced. The overlapping part B is preferably receive the lubricating processing by surface treatment and so on as the layers slide easily.

Embodiment 3

Figure 10:
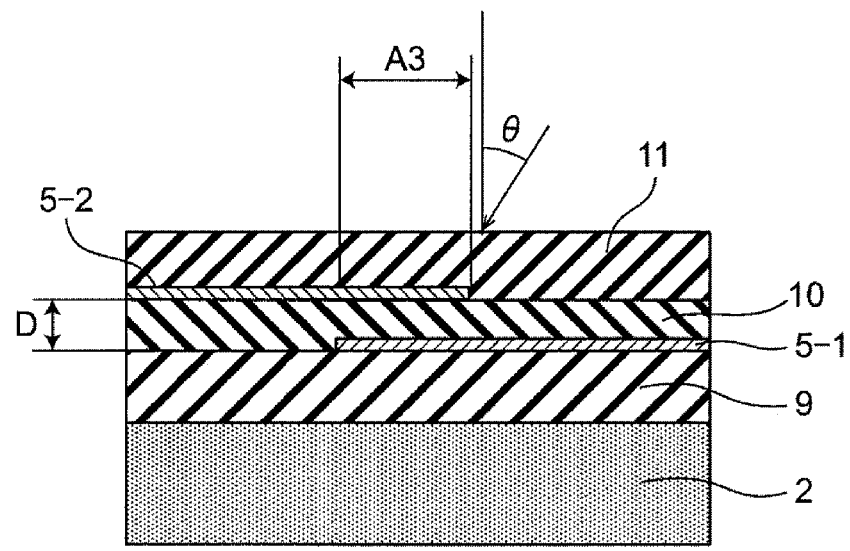
FIG. 10 is a cross-sectional enlarged view of an outer covering material of a vacuum heat insulating material according to Embodiment 3.

FIG. 10 is a cross-sectional enlarged view of an outer covering material of a vacuum heat insulating material according to Embodiment 3 of the present invention. In FIG. 10, resin layers 9 and 11 correspond to the resin layers 4 and 6 in FIG. 2. The same symbols are given to the same components as those of FIG. 2 and the explanation thereof is omitted. The outer covering material of the vacuum heat insulating material of FIG. 10 differs from the outer covering material of the vacuum heat insulating material of FIG. 2 in a point that a resin layer 10 is provided between the two radiation prevention layers 5-1 and 5-2 forming the overlapping part in addition to the outermost resin layer 11 and the radiation prevention layers 5. A3 corresponds to an overlapping length of the radiation prevention layers 5. Electromagnetic waves entering the outer covering material 3 reflect diffusely thereinside. When an incident angle θ of electromagnetic waves shown by an arrow is larger than a critical angle at which the total reflection occurs, electromagnetic waves do not enter the inside of the vacuum heat insulating material from the outside of the outer covering material 3. The condition of the total reflection is given by sin θ>sin (critical angle)=1/(refractive index). 1.6 is an enough value for the refractive index of resin as the highest refractive index of resin is 1.53 of an acrylic resin. The critical angle is 38.7 degrees when the refractive index is 1.6.

Next, the case of incident angles at which the total reflection does not occur will be explained. That is, when the incident angle is smaller than 38.7 degrees, electromagnetic waves are incident on the resin layer 10 from the resin layer 11 without being totally reflected. After that, the electromagnetic waves repeat reflection between the upper and lower radiation prevention layers 5-1 and 5-2 and are incident on the resin layer 9 to reach the core material 2.

Figure 11:
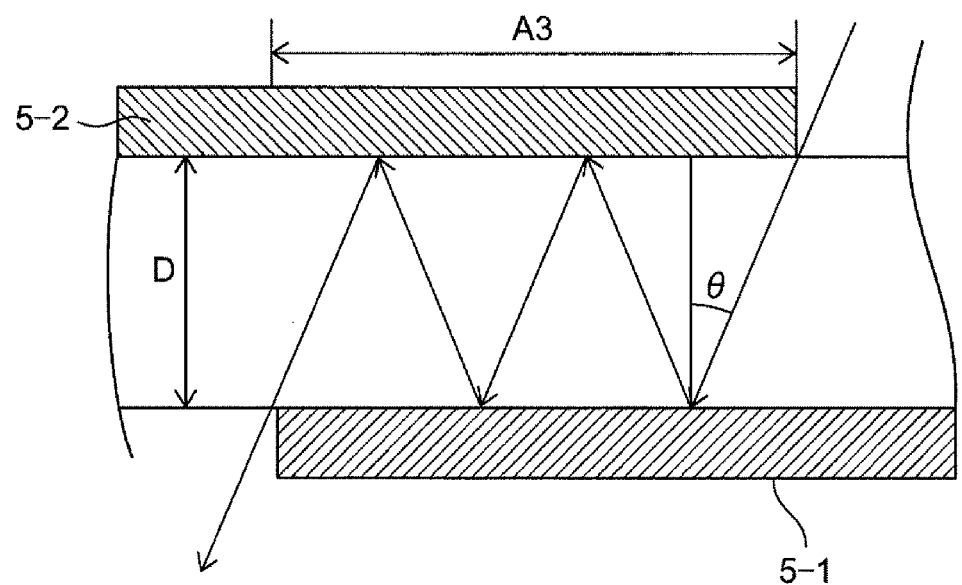
FIG. 11 is a schematic view showing a case where an electromagnetic wave incident on one resin layer with an incident angle θ at which the total reflection does not occur repeats the reflection between the upper and lower radiation prevention layers and is incident on another resin layer.

FIG. 11 is a schematic view showing the case where the electromagnetic wave incident on the resin layer 10 with the incident angle θ at which the total reflection does not occur repeats the reflection between the upper and lower radiation prevention layers 5-1 and 5-2 and is incident on the resin layer 9. In FIG. 11, the wave is incident on the resin layer 9 after five reflections, however, the number of reflections is shown for convenience of drawings, and the number of reflections varies in accordance with the incident angle θ, the thickness D of the resin layer and the length A3 of the overlapping part as described later.

Accordingly, the required length A3 of the overlapping part will be examined. The intensity of electromagnetic wave to be incident which is considered to be sufficiently attenuated is approximately $1/e^2=0.135$ when the original intensity of electromagnetic wave is 1. When the incident angle θ is 5 degrees, the transmittance is 0.94. Accordingly, in order to obtain the electromagnetic wave intensity of 0.135 when the electromagnetic wave with the intensity 1 passes through the resin layer 9 from the resin layer 11 with the incident angle 5 degrees, it is necessary that the electromagnetic wave passes through interfaces of resin layers 32 times by reflections. The 32 reflections includes losses of four times caused when passing through an interface between the air and the resin layer 11, an interface between the resin layer 11 and the resin layer 10, an interface between the resin layer 10 and the radiation prevention layer 5-1 and an interface between the resin layer 9 and the core material 2. Therefore, the number of reflections obtained by subtracting the 4 losses (32−4) will be necessary. The required overlapping length A3 can be calculated by tan 5°×thickness D×(32−4) times, which is 2.5 times of the thickness D. Similarly, when the incident angle is 10 degrees, the overlapping length A3 will be 3.5 times of the thickness D by passing through the interfaces 24 times as the transmittance is 0.92. When the incident angle is 15 degrees, the overlapping length A3 will be 4.3 times of the thickness D by passing through the interfaces 20 times as the transmittance is 0.9. When the incident angle is 20 degrees, the overlapping length A3 will be 3.3 times of the thickness D by passing through the interfaces 13 times as the transmittance is 0.85. When the incident angle is 25 degrees, the overlapping length A3 will be 1.4 times of the thickness D by passing through the interfaces 7 times as the transmittance is 0.75. When the incident angle is 30 degrees, the overlapping length A3 will be 0.6 times of the thickness D by passing through the interfaces 5 times as the transmittance is 0.62. As described above, the required overlapping length A3 is increased when the incident angle is in a range of 5 degrees to 15 degrees and is 4.3 times of the thickness D when the incident angle is 15 degrees. After that, the required overlapping length A3 is reduced when the incident angle exceeds 15 degrees, and the required overlapping length A3 is 0.6 times of the thickness D when the incident angle is 30 degrees. Accordingly, the required overlapping length A3 is set to 4.5 times or more of the thickness D which can be realized when the incident angle is 15 degrees, thereby sufficiently reducing the intensity of radiation electromagnetic waves passing from the air into the core material 2. Furthermore, the same losses are generated in the radiation electromagnetic waves passing through the outer covering material in the opposite side from the core material 2 to the air, therefore, the intensity of electromagnetic waves is reduced to 0.02 times or less as compared with the intensity obtained when electromagnetic waves are incident from the air first.

Figure 12:
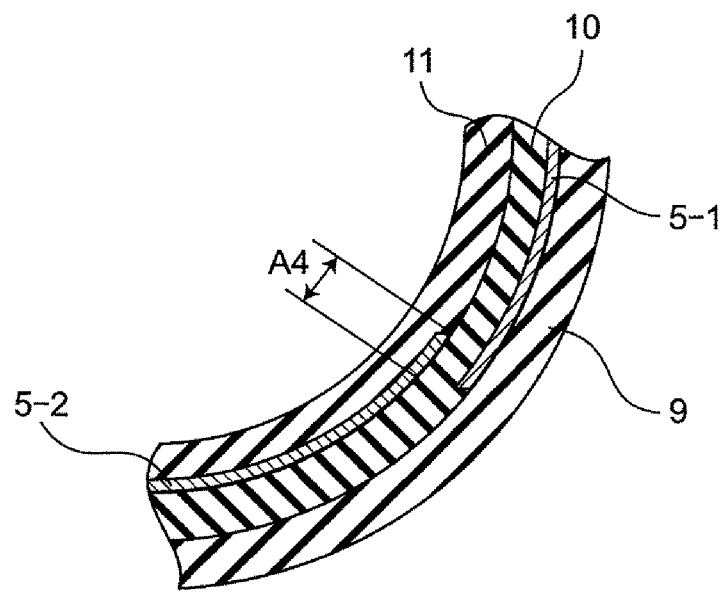
FIG. 12 is an enlarged view of the outer covering material of the vacuum heat insulating material according to Embodiment 3 obtained after bending processing is performed.

FIG. 12 is an enlarged view of the outer covering material 3 obtained after the bending processing is performed. A4 denotes an overlapping length of the radiation prevention layers 5-1 and 5-2. When the intermediate resin layer 10 is extended, the upper and lower two radiation prevention layers 5-1 and 5-2 smoothly move. As described in Embodiment 1, the radiation prevention layers 5-1 and 5-2 are not discontinuous as the radiation surface after the bending processing by allowing the overlapping part to be included in the bending processed part, therefore, the heat insulating property is not reduced. As the extension of the radiation prevention layers 5-1 and 5-2 is smaller than the extension of the resin layers, the overlapping length A4 is shorter than the overlapping length A3 of FIG. 10.

Embodiment 4

Figure 13:
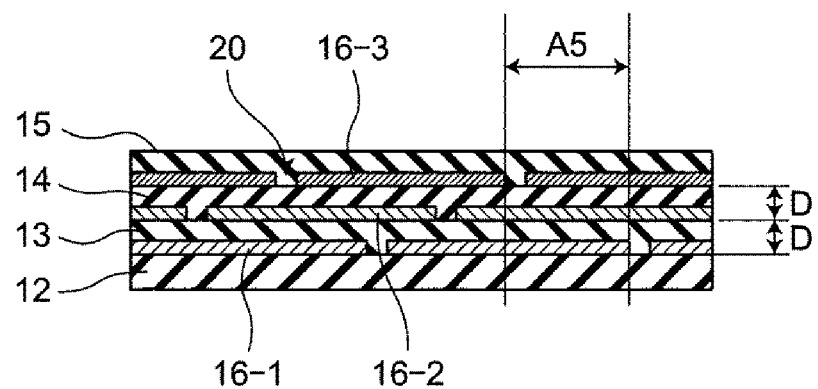
FIG. 13 is a cross-sectional enlarged view of an outer covering material of a vacuum heat insulating material according to Embodiment 4.
Figure 14:
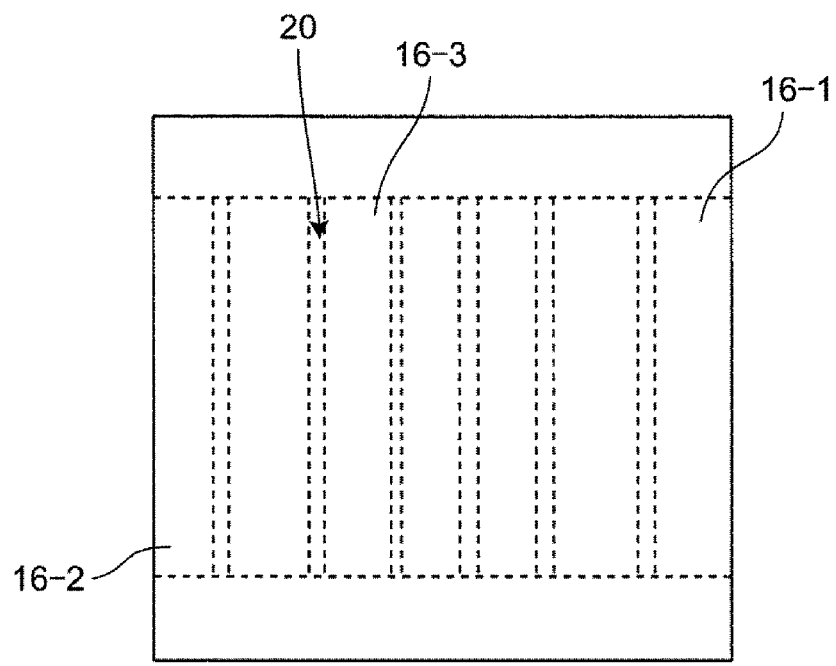
FIG. 14 is a plan view of FIG. 13.

FIG. 13 is a cross-sectional enlarged view of an outer covering material of a vacuum heat insulating material according to Embodiment 4. FIG. 14 is a plan view of FIG. 13. In FIG. 13, resin layers 12, 15 and so on correspond to the resin layers 4, 6 and so on in FIG. 2 and correspond to resin layers 9, 11 and so on in FIG. 10. Also, radiation prevention layers 16-1, 16-2, 16-3 and so on correspond to the radiation prevention layers 5-1, 5-2 and so on in FIG. 2 and FIG. 9. Therefore, the detailed explanation of these corresponding components will be omitted. The outer covering material of the vacuum heat insulating material of FIG. 13 differs from the outer covering material of the vacuum heat insulating material of FIG. 2 in a point that there are three layers of radiation prevention layers 16-1, 16-2 and 16-3, resin layers 13 and 14 respectively between the radiation prevention layers 16-1 and 16-2 as well as between the radiation prevention layers 16-2 and 16-3 and the resin layer 12 outside these layers in addition to the outermost resin layer 15 and one layer of radiation prevention layer 16-3. That is, the radiation prevention layers 16-1, 16-2 and 16-3 become a multilayer structure from two layers to three layers, and the resin layers 13 and 14 are respectively provided between the radiation prevention layers 16-1 and 16-2 as well as between the radiation prevention layers 16-2 and 16-3. Furthermore, the radiation prevention layers 16-1, 16-2 and 16-3 are provided with slits 20 extending to a direction perpendicular to the bending direction (direction vertical to the paper), which form discontinuous parts. The radiation prevention layers 16-1, 16-2 and 16-3 are arranged so as to secure an overlapping length A5 in which plural radiation prevention layers overlap when seen from the thickness direction though the layers form the discontinuous parts. The arrangement is performed, in the case of the aluminum foil, by aligning strip-shaped aluminum foils at proper intervals at the time of manufacture. In the case of the deposition film, the shape of deposition may be adjusted.

The required overlapping length A5 in the plate surface direction of the radiation prevention layers 16-1, 16-2 and 16-3 becomes the maximum when the incident angle θ is the vicinity of 15 degrees as shown in the description relating to FIG. 10. One interface of resin layers is added as one resin layer is added, therefore, it is preferable to secure the minimum necessary overlapping length A5 represented by tan 15°×thickness D×(20−(n+1)) as a general formula used when the thickness D is a fixed value. Here, "n" denotes the number of stacked resin layers. That is, the number of resin layers provided among the radiation prevention layers is increased by providing the radiation prevention layers 16-1, 16-2 and 16-3 of three layers or more. Electromagnetic waves incident on the resin layer 14 between the two radiation prevention layers 16-2 and 16-3 from the resin layer 15 in the upper layer side repeat reflection between the two radiation prevention layers 16-2 and 16-3, then, the waves are incident on the resin layer 13 in the lower layer side and repeat reflection in the same manner to be incident on the resin layer 12 in the further lower layer side. Accordingly, there is an advantage that the required overlapping length A5 of the radiation prevention layers 16-1, 16-2 and 16-3 becomes short when the number of resin layers provided among the radiation prevention layers 16-1, 16-2 and 16-3 is increased. As "n" is four layers in the embodiment, the required overlapping length A5 is 4.0 times as long as the thickness D.

Figure 15:
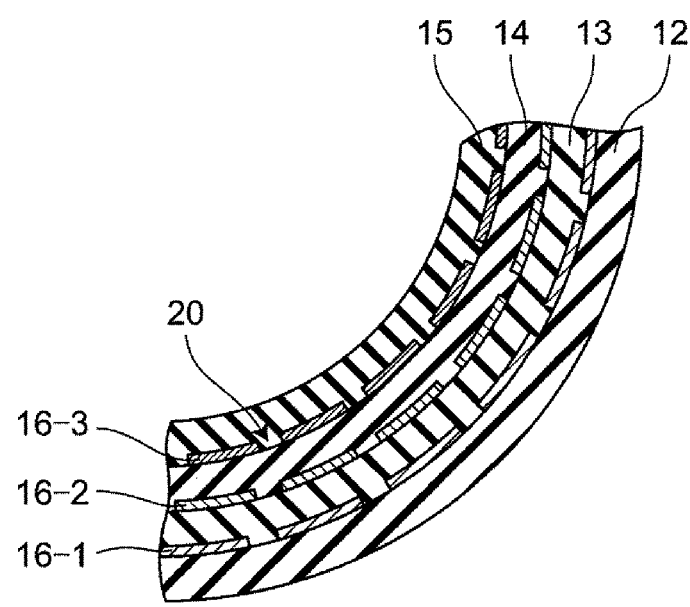
FIG. 15 is an enlarged view of the outer covering material of the vacuum heat insulating material according to Embodiment 4 obtained after bending processing is performed.

FIG. 15 is an enlarged view of the outer covering material 3 after the bending processing is performed. As the resin of the intermediate resin layers 13 and 14 as well as the resin among the radiation prevention layers 16-1, 16-2 and 16-3 are extended, movement of the three layers of the radiation prevention layers 16-1, 16-2 and 16-3 is smoothly performed. The vacuum heat insulating material differs from the vacuum heat insulating materials according to Embodiments 1 and 2 in a point that the radiation prevention layers 16-1, 16-2 and 16-3 are not discontinuous as the radiation surface in a wide range after the bending processing even when the bending processing is not performed to the overlapping part at a pin point, therefore, the heat insulating property is not reduced.

Although the resin layers 13, 14 and 15 and the radiation prevention layers 16-1, 16-2 and 16-3 are respectively three layers in FIG. 15, the present invention is not limited to three layers, and a further multilayered structure may be used.

The vacuum heat insulating material of the present disclosure can be applied to an application of a heat insulating wall in architecture as the vacuum heat insulating material has good heat insulating characteristics in which the effect of preventing radiation is not reduced as well as a corner part having high reliability can be easily formed.

What is claimed is:
1. A vacuum heat insulating material comprising:
a core material including an inorganic fiber assembly; and
an outer covering member covering at least one surface of the core material, the inside of which is decompressed and sealed, wherein the outer covering member includes:
an outermost resin layer; and
radiation prevention layers positioned inside the resin layer, in which the radiation prevention layers have an overlapping part where at least two or more radiation prevention layers are stacked at a part thereof;
wherein the vacuum heat insulating material has a corner part, and a plate thickness of the vacuum heat insulating material is 4 times or less of a bending radius of the corner part; and
wherein the outermost resin layer of the outer covering material is formed of a material which can be extended 200% or more.

2. The vacuum heat insulating material according to claim 1,
wherein the overlapping part has a space between the overlapping radiation prevention layers.

3. The vacuum heat insulating material according to claim 1,
wherein the radiation prevention layers have a thin-plate shape, and
a length of the overlapping part is a length larger than a length calculated by tan 15°×(a thickness of a resin layer)×(20−(the number of stacked resin layers+1)) with respect to the thickness of the resin layer provided between the stacked radiation prevention layers.

4. The vacuum heat insulating material according to claim 1,
wherein the radiation prevention layer includes a metal layer, and
a thickness of the metal layer is 40 nm or more.

5. The vacuum heat insulating material according to claim 4,
wherein the metal layer of the radiation prevention layer is made of aluminum.

6. The vacuum heat insulating material according to claim 1,
wherein the radiation prevention layer includes:
a first radiation prevention layer having a through hole, and
a second radiation prevention layer completely covering the through hole and forms an annular overlapping part stacked on the first radiation prevention layer around the through hole.

* * * * *